United States Patent [19]

Sekmakas

[11] 3,865,771

[45] Feb. 11, 1975

[54] CORROSION RESISTANT AND FLEXIBLE AQUEOUS COATINGS

[75] Inventor: Kazys Sekmakas, Chicago, Ill.

[73] Assignee: DeSoto, Inc., Des Plaines, Ill.

[22] Filed: Nov. 27, 1972

[21] Appl. No.: 309,654

[52] U.S. Cl.. 260/29.3, 260/29.2 EP, 260/29.4 UA, 260/848, 260/855, 204/181
[51] Int. Cl............................................. C08g 51/24
[58] Field of Search.... 260/29.3, 29.4 UA, 29.2 EP, 260/88.1 PC, 848, 855; 204/181

[56] References Cited
UNITED STATES PATENTS

| | | | |
|---|---|---|---|
| 3,262,897 | 7/1966 | Kordzinski et al. | 260/29.4 UA |
| 3,338,860 | 8/1967 | Vasta | 260/855 |
| 3,375,227 | 3/1968 | Hicks | 260/851 |
| 3,505,128 | 4/1970 | Fujii et al. | 260/29.4 UA |
| 3,646,044 | 2/1972 | Sekmakas | 260/851 |
| 3,650,998 | 3/1972 | Sekmakas et al. | 260/29.4 UA |

Primary Examiner—Lorenzo B. Hayes
Attorney, Agent, or Firm—Dressler, Goldsmith, Clement, & Gordon, Ltd.

[57] ABSTRACT

Resins capable of being electrodeposited at the anode to deposit coatings characterized by superior corrosion and detergent resistance in combination with reasonable flexibility from stable aqueous medium are provided by adducting an acidic copolymer containing a major proportion of styrene or like monomer with a stoichiometric deficiency of a long straight chain monoepoxide containing at least 12 carbon atoms and then curing the acidic hydroxy functional resin so-obtained with a water dispersible heat-hardening formaldehyde condensate. Preferably, the acidic copolymer contains at least 70 percent by weight of styrene. Also, preferably, the water dispersible heat-hardening formaldehyde condensate comprises a water dispersible heat-hardening phenolic resin which is precondensed with the hydroxy functional resin.

17 Claims, No Drawings

CORROSION RESISTANT AND FLEXIBLE AQUEOUS COATINGS

The present invention relates to stable aqueous coatings characterized by superior corrosion and detergent resistance in combination with reasonable flexibility. Aqueous coatings which can be electrodeposited are especially contemplated.

The deposition of aqueous coatings, especially by electrodeposition at the anode, has taken on increasing importance. However, these coatings have lacked superior corrosion resistance or flexibility or the aqueous compositions have lacked adequate stability. To obtain these divergent properties in combination has presented a significant industrial problem, the solution of which is the primary purpose of this invention.

In accordance with this invention, a copolymer is formed from a major weight proportion of styrene or like monomer, and a minor proportion of alpha, beta-monoethylenic carboxylic acid, especially acrylic acid. Particularly when the proportion of styrene is in excess of 70 percent by weight, it has been found that, in the combination taught herein, very exceptional corrosion and detergent resistance are obtained. However, these coatings are very brittle and inflexible and of little value. Accordingly, and in a copolymer including at least 15 percent by weight of acrylic acid or the like, a portion of the carboxyl functionality of the copolymer is reacted with a stoichiometric deficiency of long straight chain monoepoxide containing at least 12 carbon atoms to provide an hydroxy functional acidic resin containing at least 15 percent by weight, and more preferably 20 – 30 percent by weight, of said monoepoxide, based on the copolymer. These hydroxy functional acidic resins can be electrodeposited and cured with a heat-hardening formaldehyde condensate dispersed in the aqueous electrocoating bath. The heat-hardening formaldehyde condensate may be of various types, for example, a heat-hardening water dispersible aminoplast resin or a heat-hardening water dispersible phenol-formaldehyde condensate (a water dispersible phenolic resin). The cured coatings provide a continuous and non-porous film which is highly resistant to corrosion. As will be established hereinafter by comparative testing, the monoepoxide selection is critical to the new result.

In preferred practice, there is added at least 10 percent, preferably from 15–30 percent, based on the weight of total resin, of a water dispersible heat-hardening phenol-formaldehyde resin (a water dispersible phenolic resin), and this phenolic resin is precondensed with the hydroxy functional acidic resin to provide a soluble acidic condensate which can be dispersed in water with the aid of a base and which can be electrodeposited at the anode by the passage of a unidirectional electrical current through an aqueous bath containing the dispersed condensate.

When a portion of the curing agent is the water dispersible heat-hardening phenolic resin precondensed with the hydroxy functional acidic derivative, and another portion of the curing agent is a heat-hardening water dispersible aminoplast resin, then the resulting mixture provides an aqueous electrocoating bath which deposits films which cure to possess particularly outstanding corrosion resistance.

Styrene is the preferred monoethylenic monomer providing the bulk of the copolymer, but vinyl toluene may also be used. The corrosion resistance improves with increasing styrene content. Good results are obtained at 60 percent styrene content, but best results are obtained when the styrene component constitutes at least 70 percent of the weight of the copolymer, with the balance of the copolymer consisting essentially of alpha,beta-monoethylenically unsaturated acid, such as acrylic acid, methacrylic acid, crotonic acid, fumaric acid, or the like. Acrylic acid is particularly preferred.

The acid component constitutes at least 15 percent, and more preferably at least 20 percent, of the copoylmer, and this, together with the large proportion of the styrene or vinyl toluene, leaves very little of the monomer content of the copolymer unaccounted for. While it is preferred that 100 percent of the copolymer be constituted by styrene or vinyl toluene and the acid component, and any balance of the copolymer be desirably minimized, this balance of the copolymer can be constituted by any monomer which is copolymerizable in the system without gelling the same, particularly by monoethylenic monomer such as acrylate and methacrylate esters such as methyl methacrylate and ethyl acrylate and the like, acrylonitrile, hydroxy ethyl acrylate, etc.

The copolymers which are intended are of only moderate molecular weight so as to permit solubilization in organic solvents and dispersibility in water with the aid of a base. This is normally provided by copolymerization in organic solvent solution, such polymerization being entirely conventional, and being carried out in the presence of a free radical polymerization catalyst such as benzoyl peroxide or bisazobutyronitrile, or the like, as illustrated in the examples.

The solution copolymerization is customarily carried out in refluxing organic solvent, the organic solvent in this instance being selected for water miscibility in order to avoid the need for removing the polymerization solvent prior to dispersion in water.

As previously indicated, the acidic copolymer is reacted with a stoichiometric deficiency of a long straight chain monoepoxide containing at least 12 carbon atoms. The long straight chain provided by the monoepoxide would normally not contain in excess of about 30 carbon atoms, and would preferably contain from 14–22 carbon atoms. The invention will be illustrated by a mixture of olefin epoxides which contain from 14–16 carbon atoms.

The single epoxide group is provided in terminal position, conveniently by the peroxidation of a straight chain hydrocarbon containing a single ethylenic group in terminal position. The peroxidation is easily carried out by reaction with peracetic acid so as to provide a 1,2-monoepoxide. As will be appreciated, when this 1,2-monoepoxide is reacted with the carboxyl groups on the copolymer, an hydroxy ester is formed with the hydroxy group being in the 2 position and with the straight hydrocarbon chain remainder of the monoepoxide providing a terminal group extending from the adduct and supplying the extensive plasticization needed to enable the very large proportion of styrene or vinyl toluene to be tolerated.

As will later more fully appear from the results of comparative testing, the selection of the long straight chain monoepoxides specified herein is critical to the achievement of the new and improved corrosion resistance which is the primary objective of this invention.

The hydroxy functional acidic resins of the invention may have an acid value of from about 12 to about 150, preferably from about 30 to about 100.

The capacity to disperse the hydroxy functional acidic resins in water utilizing salt formation with a base, normally a nitrogenous base such as an amine, is aided by the presence of water miscible organic solvent. It will be appreciated that the choice of the base used for salt formation as well as the utilization and selection of water miscible organic solvents are common knowledge in the electrocoating art. Triethyl amine or triethanol amine are typical bases which may be used, though such simple bases as sodium and potassium hydroxide are also useful. Water miscible organic solvents are illustrated by methyl ethyl ketone, lower alcohols such as isopropyl alcohol, ether alcohols such as 2-ethoxy ethanol or 2-butoxy ethanol, and the like.

It is desired that the aqueous coating compositions of this invention be thermosetting and the thermosetting cure is provided by the presence in the water medium of the coating of dispersed heat-hardening formaldehyde condensate.

The aqueous coating composition containing the dispersed hydroxy functional acidic resin thus has incorporated therein from 5–40 percent, preferably 10–30 percent, based on the total weight of resin, of a heat-hardening formaldehyde condensate, which can be dispersed in the aqueous medium. The class of heat-hardening formaldehyde condensates is a well known class including aminoplast resins and phenolic resins. Typical aminoplast resins, all of which are formaldehyde condensates, are urea-formaldehyde, hexamethoxy methyl melamine and water dispersible transethers thereof with ethanol or other lower alcohol, benzoguanamine-formaldehyde and the like, including acidic derivatives where the carboxyl group assists solubilization in aqueous alkaline medium. This class of heat-hardening formaldehyde condensates also includes water soluble or dispersible phenolic resins, these being illustrated by the well known non-gelled alkaline condensates of phenol with excess formaldehyde known as "A" stage resols. Any of these formaldehyde condensates can be used alone or in any desired mixture thereof.

As previously indicated, the most outstanding corrosion and detergent resistance is provided by precondensing the hydroxy functional acidic resin with the water soluble or water dispersible phenol-formaldehyde condensate. These water dispersible heat-hardening phenolic resins are themselves well known, and are provided by condensing the phenol with an excess of formaldehyde in the presence of a basic catalyst, the reaction being carried out under moderate conditions of elevated temperature and for a limited period of time so as to avoid gelation of the resin. The resulting product is frequently referred to in the art as an A stage resol and a typical A stage resol is illustrated in Example 6 hereinafter. It is of interest to note that if the temperature is permitted to rise excessively, the resin of Example 6 will gel which would render the resin useless in this invention.

The water dispersible heat-hardening phenolic resin is then cooked to precondense the same with the hydroxy functional acidic resin until the blended components are fully compatibilized with one another in order to form the preferred condensates for use in this invention.

These condensates of the phenolic resin with the hydroxy functional acidic resin are desirably used in admixture with at least 5 percent, based on total resin, of an aminoplast resin as previously defined, most preferably with an aminoplast resin based on benzoguanamine as illustrated in the examples.

As is conventional with aqueous electrocoating baths, these should have a pH of 6 or higher. The invention performs especially well at a pH of 8.0 and higher, a pH of up to about 11 being practical, but preferably it is less than 9.6. Best results are obtained at pH 8.6 – 9.4.

The resins of the invention are desirably supplied to the electrocoating bath in the form of a solution in water miscible organic solvent, these being used in an amount of at least 12 percent by weight, based on the weight of the resins which are dispersed in the water phase. The water miscible organic solvent content of the bath is desirably minimized and should not exceed 50 percent of the weight of the resins. Appropriate solvents have been identified hereinbefore. In addition, the dispersion in water is preferably formulated to contain 2–20 percent, preferably 5–15 percent, of resin solids. Where use as an ordinary coating solution is intended, higher resin solids content, e.g., 25 percent or higher, is necessary.

The films deposited on the anode in accordance with the invention (or otherwise deposited) are baked to cure the same, appropriate baking conditions being from 200°–600°F. for periods varying from about 20 seconds at the highest temperatures to about 1 hour at the lowest temperatures. Normally, a baking temperature of at least about 300°F. is used.

The invention is illustrated in the following examples in which all parts are by weight, unless otherwise indicated.

EXAMPLE 1

Preparation of Styrene-Acrylic Acid-Olefin Epoxide Terpolymer

Parts by Weight
1. 800 2-Butoxy Ethanol — Charge to reactor and heat to 140°C.
2. 920 Styrene
   340 Acrylic Acid
   60 Benzoyl Peroxide
   Premix monomers and catalyst. Add to reactor over 3½ hours at 183°–140°C. Hold for 1 hour.
3. 4 Tertiary-butyl perbenzoate — Add catalyst, hold 1 hour.
4. 4 Tertiary-butyl perbenzoate — Add catalyst, hold 1 hour. Cool to 120°C.
5. 8 Triethyl Amine — Add amine slowly over 10 minute period. Acid value 126.
6. 480 Olefin Epoxide 14–16 — Add epoxide over a 30 minute period. Hold for an acid value of 52 to 53 for the solution. (see note 1)
7. 250 Isopropanol — Add and cool.

Final characteristics of the polymer:
Solids: 64.9%
Viscosity (Gardner) Z4
Color (Gardner-Holdt) 2
Acid Value (on solids) 79.1

Note 1 — A mixture of $C_{14}$ and $C_{16}$ 1,2-monoepoxides. The total 1,2-monoepoxide content is 90.79 percent, 66.52 percent being $C_{14}$ monoepoxide and 24.27 percent being $C_{16}$ monoepoxide. The oxirane oxygen content is 6.8 percent, the iodine number is 2.2, and the acidity is 0.31 percent as acetic acid.

In order to demonstrate the critical value and superior properties of the long chain olefin epoxide as compared to other monoepoxides (propylene oxide, butylene oxide and long chain epoxide esters such as the commercial product Cardura E), the following experiments were performed.

The olefin epoxide in Example 1 was replaced on an equimolar basis utilizing propylene oxide, butylene oxide and Cardura E. As a control, the styrene-acrylic acid copolymer produced in Example 1 was included, this copolymer not being modified with any epoxide.

| Component (moles) | Ex. 1 | Ex. 2 | Ex. 3 | Ex. 4 | Ex. 5 |
|---|---|---|---|---|---|
| Acrylic Acid | 4.72 | 4.72 | 4.72 | 4.72 | 4.72 |
| Olefin Epoxide (note 1) | 2.0 | — | — | — | — |
| Propylene Oxide | — | 2.0 | — | — | — |
| Butylene Oxide | — | — | 2.0 | — | — |
| Cardura E | — | — | — | 2.0 | — |
| Final acid value of resin (based on solids) | 79.1 | 79.7 | 79.4 | 79.3 | 187 |

Formulations for Electrocoating

A clear formulation using the resins of Examples 1 to 5 is made by thoroughly mixing the following in a high speed mixer.

Parts by Weight
  100 Resin solution of Examples 1, 2, 3, 4 or 5.
  20 Isopropyl Alcohol
  24 Water Dispersible Benzoguanamine Resin
  7 Dimethyl Ethanol Amine
  800 Deionized Water The above formulation has a solids content of 9.5 percent and a pH of 9.2. The solution is subjected to a direct current at 150 volts to coat a film having a thickness of 0.6 mil, when cured at 425°F. for 20 minutes. Zinc phosphate treated steel panels were used. The properties of the coatings obtained and other factors regarding the electrodeposition are tabulated below:

film, especially when aminoplast resins are used in admixture with the phenolic precondensates.

EXAMPLE 6

Preparation of Water Dispersible Heat Reactive Phenolic Resin

Parts by Weight
  210 Phenol
  114 Paraformaldehyde
  196 Deionized Water
  16 Sodium Hydroxide Set reflux condenser. Heat to 93°C. in 50 minutes. Turn off heat. Allow to exotherm to 97°C. Cool to 90°C. Hold under reflux for 60 minutes at 90°C. and then cool to provide an intermediate having a solids content of 55.3 percent and a Viscosity (Gardner) of A–B.

EXAMPLE 7

Preparation of Phenolic Condensate with Styrene-Acrylic Polymer of Example 1

Parts by Weight
  3000 — Styrene-Acrylic Acid-Olefin Resin of Example 1 (64.9 percent solids)
  600 — Phenolic Resin of Example 6 (55.3 percent solids)

Charge both components to reactor and using fast agitation and nitrogen blanket, heat to 90°C. in 45 minutes. Hold for 1 hour at 90°C. and then cool to room temperature.

| Property | Ex. 1 | Ex. 2 | Ex. 3 | Ex. 4 | Ex. 5 |
|---|---|---|---|---|---|
| Film Appearance | Glossy smooth even | Rough porous | Rough porous | Low gloss rough | Very rough porous |
| Flexibility (¼" Mandrel) | Pass | Fail | Fail | Fail | Fail |
| Impact (direct 60 inch/lb.) | Pass | Fail | Fail | Pass | Fail |
| Impact (reverse 40 inch/lb.) | Pass | Fail | Fail | Fail | Fail |
| Pencil Hardness | 4H | 4H | 4H | 4H | 5H |
| Salt Spray (5% solution - 300 hrs.) | Pass | Fail Rusting | Fail Rusting | Fail Rusting | Fail - Very bad rusting |
| 1% synthetic detergent resistance (160°F. - 100 hrs. test) | Blisters | Rusting | Rusting | Rusting | Very bad rusting |

Phenolic Precondensates

The corrosion resistance properties of the styrene-acrylic acid-olefin resin can be further improved by precondensing the resin with a water dispersible heat reactive phenolic resin. The phenolic resin precondensate improves salt spray and detergent resistance, and it also improves the physical properties of the cured Ratio of resin solids:
  Styrene-Acrylic Acid-Olefin: 85%
  Phenolic Resin: 15%

The final characteristics of the condensate of this example are:
  Solids (percent) 62.3
  Gardner Viscosity $Z_5 - Z_6$
  Gardner-Holdt Color 4 – 5

Acid Value (on solids) 56.1

Formulation for Electrocoating Utilizing Resin of Example 7

A clear formulation using the resin of Example 7 is made using the following procedure.

Premix 100 parts of the resin of Example 7 with 20 parts of 2-ethoxy ethanol, 24 parts water dispersible benzoguanamine resin and 8 parts diethyl ethanol amine. Then add 800 parts of deionized water, slowly, with fast agitation.

The above formulation has a solids content of 9.3 percent and a pH of 9.4.

The solution is subjected to direct current at 125 volts to coat a film having a thickness of 0.4 mil when cured at 425°F. for 20 minutes. Zinc phosphate treated panels were used.

The following properties of the coating were obtained.

Film appearance: Glossy, smooth
Flexibility (1/4 inch Mandrel): Pass
Impact (direct 60 inch/lb.): Pass
Impact (reverse 40 inch/lb.): Pass
Pencil Hardness: 6H
Salt Spray (5 percent salt solution for 500 hrs): Pass
1 percent Synthetic Detergent Resistance at 160°F. (100 hour test): Pass

EXAMPLE 8

Example 7 was repeated utilizing styrene-acrylic acid-propylene oxide resin of Example 2, and condensed with phenol-formaldehyde intermediate. This polymer, when electro-coated, exhibited very poor flexibility and impact properties, and the film was porous and discontinuous. This film had very poor corrosion and rusting properties.

The benzoguanamine resin utilized in the foregoing examples is a water-insoluble, heat-hardening condensate of benzoguanamine with a stoichiometric excess of formaldehyde. The product is produced by reacting 750 grams of n-butyl Formcel (40 percent formaldehyde, 51.5 percent n-butanol and 8.5 percent water), 630 grams benzoguanamine, and 412 additional grams of n-butanol. The mixture is heated with agitation to 195°–200°F. which is maintained for 10–15 minutes until all of the benzoguanamine has dissolved. The pH is adjusted to 4.3–4.5 using a 10 percent aqueous formic acid solution (approximately 50 milliliters are needed). The temperature is then raised to 203°–206°F. to distill n-butanol which is returned as reflux until water (not returned) is no longer generated. After water is no longer generated, butanol is collected in an amount equal to the volume of water which had been collected. The product is then thinned with 310 grams xylene and 135 grams n-butanol and is filtered and then adjusted to 60 percent nonvolatile solids using a 50/50 weight ratio mixture of xylene and n-butanol. If desired, comparable results can be obtained by utilizing in place of the benzoguanamine resin condensate described above, the commercial material Uformite QR-336 (Rohm & Haas).

The invention is defined in the claims which follow.

I claim:

1. An aqueous thermosetting coating composition comprising water having stably dispersed therein with the aid of a base, an hydroxy functional acidic resin having an acid value of from about 12 to about 150 and which is an adduct of a copolymer of at least 60 percent of styrene or vinyl toluene and at least 15 percent by weight of alpha, beta-monoethylenic unsaturated carboxylic acid with a stoichiometric deficiency of long straight chain olefin monoepoxide containing at least 12 carbon atoms, there being at least 15 percent by weight of said monoepoxide based on the copolymer, there being further dispersed in said water from 5–40 percent, based on the total weight of resin, of a heat-hardening formaldehyde condensate selected from the group consisting of aminoplast resins and water-dispersible phenolic resins.

2. A coating composition as recited in claim 1 in which said copolymer further contains at least 20 percent of said acid.

3. A coating composition as recited in claim 2 in which said acid is acrylic acid.

4. A coating composition as recited in claim 1 in which said composition includes water-miscible organic solvent.

5. A coating composition as recited in claim 1 in which said monoepoxide is a 1,2-monoepoxide containing from 14–22 carbon atoms.

6. A coating composition as recited in claim 5 in which said monoepoxide is an olefin oxide containing from 14–16 carbon atoms.

7. A coating composition as recited in claim 1 in which said acidic resin has an acid number of from about 30 to about 100.

8. A coating composition as recited in claim 1 in which said acidic resin is dispersible in water with the aid of an amine.

9. A coating composition as recited in claim 1 in which said heat-hardening formaldehyde condensate comprises aminoplast resin.

10. A coating composition as recited in claim 9 in which said heat-hardening formaldehyde condensate further comprises water dispersible heat-hardening phenolic resin.

11. A coating composition as recited in claim 10 in which said heat-hardening phenolic resin is precondensed with said hydroxy functional acidic resin.

12. A coating composition as recited in claim 11 in which said heat-hardening phenolic resin is an A stage resol.

13. A coating composition as recited in claim 1 in which said monoepoxide is present in an amount of from 20–30 percent, based on the copolymer.

14. An aqueous thermosetting coating composition comprising water having stably dispersed therein with the aid of a base, an hydroxy functional acidic resin having an acid value of from 30–100 and which is an adduct of a copolymer consisting essentially of at least 70 percent by weight of styrene and at least 15 percent by weight of alpha, beta-monoethylenic monocarboxylic acid with a stoichiometric deficiency of long straight chain olefin 1,2-monoepoxide containing from 14–16 carbon atoms, there being from 20–30 percent by weight of said monoepoxide based on the copolymer, there being further dispersed in said water from 5–40 percent, based on the total weight of resin, of heat-hardening formaldehyde condensate comprising aminoplast resin.

15. A coating composition as recited in claim 14 in which said hydroxy functional acidic resin is precondensed with a water dispersible phenolic resin which is an A stage resol.

16. An aqueous electrocoating bath comprising the aqueous coating composition of claim 1 containing from 2-20 percent by weight of resin solids.

17. An electrocoating bath as recited in claim 16 in which said bath contains from 5-15 percent resin solids, and includes from 12-50 percent, based on the weight of the resins, of water miscible organic solvent, and said bath has a pH in the range of 8.0 up to about 11.

* * * * *